(12) United States Patent
Kaskel et al.

(10) Patent No.: US 8,468,600 B1
(45) Date of Patent: Jun. 18, 2013

(54) HANDLING INSTRUCTION RECEIVED FROM A SANDBOXED THREAD OF EXECUTION

(75) Inventors: Bruce E. Kaskel, Bothell, WA (US); Paul Holland, Issaquah, WA (US)

(73) Assignee: Adobe Systems Incorporated, San Jose, CA (US)

(*) Notice: Subject to any disclaimer, the term of this patent is extended or adjusted under 35 U.S.C. 154(b) by 186 days.

(21) Appl. No.: 13/041,168

(22) Filed: Mar. 4, 2011

(51) Int. Cl.
*G06F 21/00* (2006.01)

(52) U.S. Cl.
USPC .......................................................... 726/22

(58) Field of Classification Search
None
See application file for complete search history.

(56) References Cited

U.S. PATENT DOCUMENTS

| | | | |
|---|---|---|---|
| 2004/0003324 A1* | 1/2004 | Uhlig et al. | 714/38 |
| 2006/0117325 A1* | 6/2006 | Wieland et al. | 719/321 |
| 2007/0006178 A1* | 1/2007 | Tan | 717/136 |
| 2010/0192224 A1 | 7/2010 | Ferri et al. | |

OTHER PUBLICATIONS

'Call gate' [online]. Wikipedia, 2010 [retrieved on Mar. 10, 2011]. Retrieved from the Internet: <URL: http://en.wikipedia.org/wiki/Call_gate>.
"x86 Assembly Language Reference Manual." Sun Microsystems, Inc., 1995, 204 pages.
Yee, Bennet et al. "Native Client: A Sandbox for Portable, Untrusted x86 Native Code." Google Inc., 2009, 15 pages.
Banginwar, Rajesh et al. "Sandboxer: Light-Weight Application Isolation in Mobile Internet Devices." Linux Symposium, 2009, 12 pages.
'Adobe to Use Sandbox to Secure Reader' [online]. PC Magazine, Ziff Davis, Inc., 2010 [retrieved on Mar. 10, 2011]. Retrieved from the Internet: <URL: http://www.pcmag.com/article2/0,2817,2366755,00.asp>.
'Adobe Reader X—Sandbox' [online]. Internet Storm Center, SANS Technology Institute, 2011 [retrieved on Mar. 10, 2011]. Retrieved from the Internet: <URL: http://isc.sans.edu/diary.html?storyid=9976>.
'Google updates Chrome to sandbox PDF files' [online]. The Inquirer, Incisive Media Investments Limited, 2010 [retrieved on Mar. 10, 2011]. Retrieved from the Internet: <URL: http://www.theinquirer.net/inquirer/news/1929984/google-updates-chrome-sandbox-pdf-files>.
'Extracting scripts and data from suspect PDF files' [Online]. Internet Storm Center, SANS Technology Institute, 2008 [retrieved on Mar. 10, 2011]. Retrieved from the Internet: <URL: http://isc.sans.edu/diary.html?storyid=4726>.
Crowly, Chris, 'The Purpose and Application of Virtualization Technology' [online]. The SANS Institute, 2008 [retrieved on Mar. 10, 2011]. Retrieved from the Internet: <URL: http://www.sans.org/security-resources/security_plus/virtualization_sp08.php>.
"Intel® 64 and IA-32 Architectures Software Developer's Manual" Intel Corporation, Mar. 2010, 512 pages.

* cited by examiner

*Primary Examiner* — David Pearson
(74) *Attorney, Agent, or Firm* — Wolfe-SBMC

(57) ABSTRACT

Methods, systems, and apparatus, including computer programs encoded on a computer storage medium, for enveloping a thread of execution within an IDT-based secure sandbox. In one aspect, embodiments of the invention provide a method performed in a computer system, the method receiving an instruction from an execution thread where the computer system can be configured for redirection of instructions from the execution thread. The method can determine whether the instruction includes at least one of an interrupt instruction, a system call instruction and a system enter instruction. In response to determining that the instruction includes at least one of the interrupt instruction, the system call instruction and the system enter instruction, the method can further: (i) eliminate the redirection, (ii) modify a stack to specify return of control, and (iii) thereafter, pass the control to an operating system kernel.

18 Claims, 6 Drawing Sheets

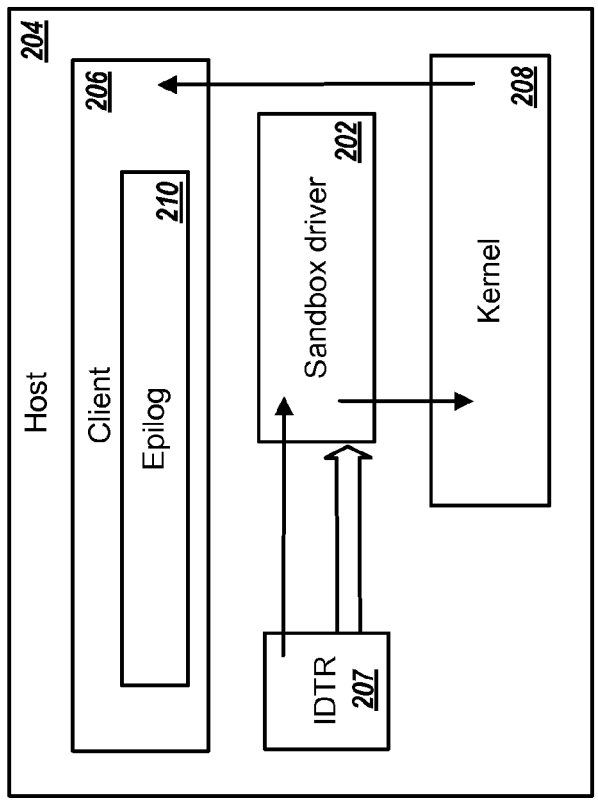
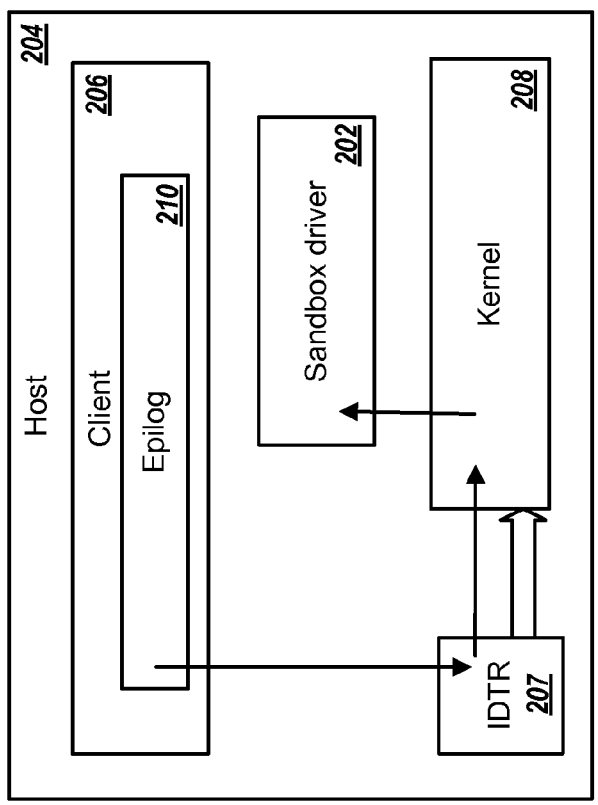
FIG. 5B
FIG. 5A

HANDLING INSTRUCTION RECEIVED FROM A SANDBOXED THREAD OF EXECUTION

BACKGROUND

This specification relates to the use of sandboxes for secure execution of untrusted software applications.

Secure execution of software applications is important in all computer systems. For example, bugs in an application's code, bugs in third party libraries and bugs in an operating system can open up the application to a security attack. Executing a thread in a secure sandbox provided by a host might prevent untrusted code from performing malicious activities on the host. Sandboxing can allow a thread to execute in a secure environment included in a computing system. One or more applications executing on the computing system may need to execute identified untested or untrusted code securely. For example, a computing system can enable and use a secure sandbox to execute the identified untested or untrusted code. The computing system can execute the identified code separately from other code in order to prevent the identified code from performing unwanted or, in some cases, malicious tasks in the computing system. A client application running on a host computing system can set up the secure sandbox and use it to execute the identified code. The secure sandbox can monitor the execution of the thread while providing a controlled set of resources for use by the thread. For example, a sandbox can allow a client application to securely execute a thread running applications downloaded from the Internet or third party libraries. In addition, an application that accesses and uses untrusted data can be potentially open to security attacks.

A processor uses one or more interrupt descriptor tables (IDTs) to decide what to do when an interrupt occurs. In situations where more than one IDT has been created, an IDT register (IDTR) can be included in a host computing system to point to the current IDT, such as a standard or default IDT. Moreover, a device driver can modify the IDTR to instead point to another IDT, such as a custom IDT. This can allow untrusted code to operate in a secure sandbox without having access to the operating system kernel.

In some situations, in order to run untrusted code securely, a second copy is made of the operating system and a secure sandbox for executing the untrusted code is included and executed in the second copy of the operating system. This requires two versions of the operating system.

In some situations, applications running on a host computing system (e.g., anti-virus software and rootkits) may modify a system service dispatch table (SSDT) (e.g., the Windows System Service Dispatch Table included in the Windows Operating System) in order to run untrusted code in a secure sandbox. However, in order to run trusted code in the operating system kernel, the SSDT needs to be switched back to its unmodified version (the version of the SSDT the operating system kernel expects to see while executing code in the operating system kernel). Failure to switch the SSDT can result in the operating system flagging the change in the SSDT as a system error resulting in the shutdown of the host computing system.

Therefore, there exists a need to allow a host computing system to run untrusted code in a secure sandbox while allowing trusted code to execute in the operating system kernel without the possibility of the operating system flagging an error and without the need for two versions of the operating system.

SUMMARY

In one aspect, embodiments of the invention provide a method performed in a computer system, the method receiving an instruction from an execution thread where the computer system can be configured for redirection of instructions from the execution thread. The method can determine whether the instruction includes at least one of an interrupt instruction, a system call instruction and a system enter instruction. In response to determining that the instruction includes at least one of the interrupt instruction, the system call instruction and the system enter instruction, the method can further: (i) eliminate the redirection, (ii) modify a stack to specify return of control, and (iii) thereafter, pass the control to an operating system kernel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-B are block diagrams illustrating an example of re-sandboxing after the device driver of FIG. 1 passes, and the operating system kernel of FIG. 1 handles, an interrupt.

Like reference numbers and designations in the various drawings indicate like elements.

DETAILED DESCRIPTION

Figure 1:
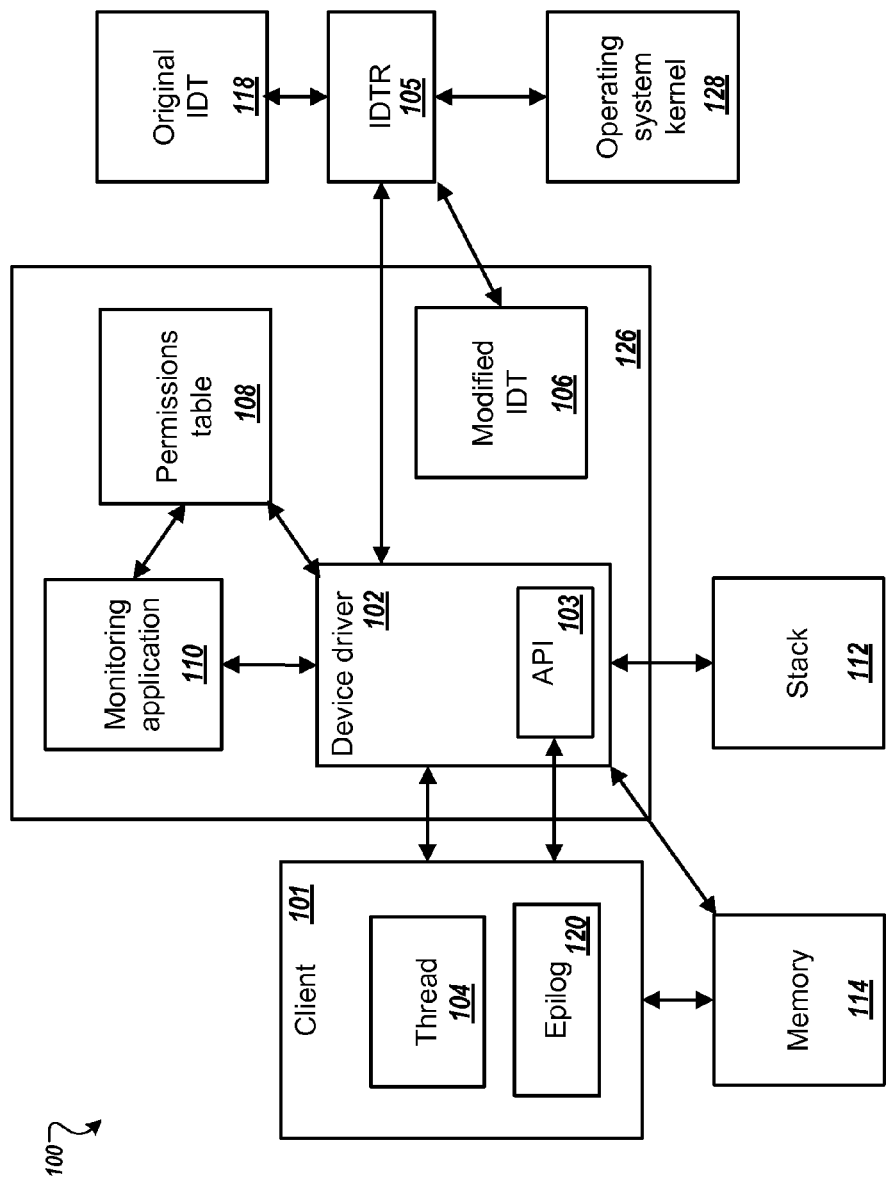
FIG. 1 is block diagram illustrating an example of a computing system that can be used for enveloping a client application's thread of execution within an IDT based secure sandbox.

This specification describes technologies for enveloping a thread of execution within a sandbox. Some embodiments of the subject matter can be implemented such that a client application that wants to envelop an execution thread can do so with a sandbox that makes use of an interrupt descriptor table (IDT). The IDT can be a table provided in the memory of a host computing environment that includes a list of pointers to interrupt service routines. Particularly, the client application can make a call to a device driver which in response changes an interrupt descriptor table register (IDTR) so that interrupts are redirected to driver-controlled code while the untrusted sandboxed thread is executing. Other calls, for example syscall and sysenter instructions, can be similarly redirected. An example of a computing system where an execution thread can be sandboxed is described below with reference to FIG. 1, and an example of how the sandbox can be requested and generated is described with reference to FIGS. 2A-B.

In the sandboxed state any call from the sandboxed thread into the operating system is trapped, and it can then be decided whether to ignore or filter the call, or shut down the sandboxed thread. An example of intercepting an operating system instruction is described below with reference to FIG. 3.

When an interrupt or syscall/sysenter is detected that should be passed on to the kernel (such as an approved operating system call or a timer interrupt), the IDTR is restored to the original value supplied by the operating system, the stack is modified to insure that control will be returned to the driver after the interrupt or syscall/sysenter is processed, and then control is passed to the operating system kernel. An example of passing an interrupt or syscall/sysenter through to the kernel is described below with reference to FIGS. 4A-B.

After the kernel has finished processing the interrupt or syscall/sysenter, control is returned at the address injected by the driver into the stack. This code requests that the security sandbox be re-enabled, and control is then returned to the sandboxed client code at the point where the original interrupt or syscall/sysenter occurred. An example of re-sandboxing after an interrupt or system call has been handled is described below with reference to FIGS. 5A-B.

Particular embodiments of the subject matter described in this specification can be implemented so as to realize one or more of the following advantages. A client application can envelop an execution thread using a secure sandbox that makes use of an IDT. An execution thread can be prevented from transferring control to an operating system kernel. A sandboxed thread can be prevented from exploiting operating system or host application bugs.

As will be described in more detail below, also in conjunction with FIGS. 1-6, some implementations include systems and techniques in which a device driver provides an application program interface (API) that a client application can call to implement a secure sandbox. The secure environment provided by the sandbox can execute a thread in an environment that is isolated from the operating system kernel as well as additional operating system specific registers. The isolation can prevent the thread from executing malicious code that could cause damage to the operating system kernel and the host computing environment as the thread cannot have direct access to the operating system kernel functions. Examples below will illustrate that the client application can make such a call to the device driver without involving the operating system kernel. Once established, the sandbox can provide selective redirection of interrupts and/or other system calls.

FIG. 1 is a block diagram illustrating an example of a computing system 100 that can be used for enveloping a client application's thread of execution within an IDT based secure sandbox 126. For example, the computing system 100 can be referred to as a host. Such a secure sandbox 126 can prevent execution of a thread 104 from transferring control directly to an operating system kernel 128. As a consequence, the sandboxed thread 104 cannot exploit operating system or host application bugs. As another example, the secure sandbox 126 can reduce the privileges under which the sandboxed thread 104 executes as compared to the privileges the thread 104 would have if executed outside of the sandbox.

The computing system 100 can execute one or more client applications (e.g., client application 101). The client application 101 can include trusted code that can be executed by the computing system 100. The client application 101 can access code from a variety of additional sources (e.g., the Internet, third party libraries) both known and unknown to the computing system 100.

For example, the client application 101 can open a formatted text file (not shown) for viewing by a user. The text file may originate from a source unknown to the client application 101 (e.g., a web site). The client application 101 does not have knowledge of the content of the file or its origin. The client application 101 can determine that the code for opening the file be run in a thread 104 in a secure sandbox. In another example, the client application 101 may use a third party library (not shown) to print the contents of a file. Since the library is from an outside source, the client application 101 is unaware of its contents and may decide to run a thread 104 for the code to print the file in the secure sandbox 126.

The client application 101 can generate one or more of the thread 104. For example, each thread (e.g., thread 104) can be an instance generated for the execution of at least one task or operation for the client application 101. The client application 101 can be configured so that one or more instructions or function calls in the thread 104 should be executed in a secure environment. The client application 101 can therefore initiate execution of the thread 104 in the secure sandbox 126. To do so, the client application 101 can first generate a traditional kernel-mediated system call to a device driver 102. The client application 101 can then call directly into the device driver 102 in order to envelop the execution of the thread 104 in the IDT-based secure sandbox 126. In other words, the device driver 102 can enable a sandbox process for the execution of the thread 104. By way of analogy, the sandbox process can be seen as switching "on" a monitoring step for the execution of the thread 104, and the monitoring step can be switched "off" when the sandboxing is no longer needed.

The client application 101 can determine that the thread 104 should execute in a secure environment based on the functions called in the thread 104. For example, if the functions called in the thread 104 are from an unidentified third party (e.g., code downloaded from the Internet) there is the potential that the functions could perform malicious operations in the computing system.

In some implementations, any call from the sandboxed thread 104 to the operating system kernel 128 is trapped by the device driver 102, which can then decide to ignore or filter the call, or shut down the sandboxed thread 104. When the driver 102 detects an interrupt or syscall/sysenter that should be passed on to the kernel 128 (such as an approved operating system call or a timer interrupt), the driver 102 can perform the necessary operations to let the call through. For example, the driver 102 restores an IDTR 105 to an original value supplied by the operating system, modifies a stack 112 to insure that control will be returned to the driver after the interrupt or syscall/sysenter is processed, and then passes control to the operating system kernel 128. After the kernel 128 has finished processing the interrupt or syscall/sysenter, control is passed to the code at an address injected by the driver 102 into the stack 112. In such implementations, the driver 102 then re-enables the security sandbox 126, and thereafter the driver 102 returns control to the thread 104 at the point where the original interrupt or syscall/sysenter occurred.

Interrupts can include, but are not limited to, hardware interrupts, software interrupts, maskable interrupts and non-maskable interrupts. For example, when an interrupt occurs, an interrupt vector value is determined based on the interrupt value and a descriptor byte size. For example, the interrupt value can be a numerical value.

For example, in the Microsoft MS-DOS operating system, when mouse movement is detected, the computing system generates a mouse interrupt (INT 33 h). The interrupt vector value is determined and used to index the IDT. The associated descriptor determines what kernel code will execute to perform the actions (movement of the cursor) in response to the receipt of the interrupt.

In some implementations, the client 101 can execute operating system calls such as a "fast" system call (e.g., a syscall or a sysenter). Alternatively, the operating system can use an interrupt with a specific value (e.g., 2Eh) as an operating system entry point for the system calls. The thread 104 executing in the sandbox 126 can use these techniques to make a system call to request a service from the operating system's kernel 128 that the thread may not have permission to run.

In response to the call from the client application 101 to enable the secure sandbox 126, the device driver 102 modifies the IDTR 105 to include a base address for a modified IDT 106. The IDTR 105 includes the base address for the modified IDT 106 and the length (e.g., in bytes) for the modified IDT 106. The device driver 102 can store the original value of the IDTR 105, for example, in memory 114 included in the computing system 100, prior to modifying the value of the IDTR 105. The original value of the IDTR 105 can be the value of the IDTR 105 set by the operating system when the computing system 100 is initialized (e.g., at system boot). The device driver 102 can access a permissions table 108 that includes interrupt values (e.g., numerical values) and system call values, for interrupts and system calls that the driver 102 can identify and intercept. The permissions table 108 can be included in the memory 114 in the computing system 100.

The permissions table 108 can be created prior to the sandboxing of the thread 104. In some implementations, the device driver 102 can be compiled with the permissions table 108 in order for the permissions table 108 to be included with the device driver 102 and therefore loaded with the device driver 102. In some implementations, the client application (e.g., client application 101) that generates and sandboxes the thread 104 can specify the contents of the permissions table 108. In some implementations, one or more additional, different applications (not shown) running on the computing system 100 can specify the contents of the permissions table 108 prior to the running of the application that generates the thread 104.

In implementing the secure sandbox 126, the client application 101 makes a call to the operating system kernel 128 in order to tell the device driver 102 to enable the secure sandbox 126 by modifying the IDTR 105 to include a base address for the modified IDT 106. The operating system kernel 128 mediates and executes the device driver call and the device driver call returns from the device driver 102 through the operating system kernel 128 to the client application 101.

In some implementations, the sandbox 126 can provide an environment for implementing operating system virtualization in a native operating system (e.g., OS/X). For example, the sandbox 126 can run a virtual operating system that includes a monitoring application 110. The monitoring application 110 can translate non-native operating system (e.g., MS-DOS) interrupts to analogous native operating system (e.g., OS/X) calls or interrupts for execution by the native operating system.

The following are examples illustrating operations that can be performed when the secure sandbox 126 has been established. While monitoring the execution of the thread 104 in the secure sandbox 126, the device driver 102 identifies and traps a call into the operating system kernel 128. A call into the operating system can include an interrupt instruction (an interrupt) or an operating system instruction (e.g., sysenter or syscall). In some implementations, the device driver 102 determines, by accessing the permissions table 108, that the trapped call is an interrupt whose value is included in the permissions table 108. Interrupt values and system call values included in the permissions table 108 are operating system calls whose service routines are flagged for execution within the secure sandbox 126. In some implementations, this can be done by the device driver 102 passing the trapped call (e.g., the interrupt value) to the monitoring application 110. The monitoring application 110 can determine, by accessing the permissions table 108, that the trapped call is an interrupt whose value is included in the permissions table 108. The monitoring application 110 can then inform the device driver 102 to filter the trapped call (e.g., the interrupt).

In order for the thread 104 to execute the interrupt, the return address and the flag register are saved on the stack 112. The IDTR 105 is used to access the modified IDT 106 in order to run the associated replacement code provided by the device driver 102 to perform the function for the trapped call. In a sense, the modified IDT 106 can serve as a gateway between the thread 104 and the operating system kernel 128.

Once the execution of the replacement code is complete, the device driver 102 returns control to the thread 104 at the point where the call into the operating system occurred. Thread execution proceeds with the device driver 102 continuing to monitor the execution of the thread 104.

In some implementations, the device driver 102 determines that the trapped call is a fast call instruction (e.g., a syscall or a sysenter). As described, the thread 104 executes the fast call in the secure sandbox 126 in a similar manner as an identified interrupt.

While continuing to monitor the execution of the thread 104, the device driver 102 identifies and traps another call into the operating system kernel 128. In contrast to the example above, the device driver 102 now determines that the trapped call is an interrupt whose value is not included in the permissions table 108. The interrupt service routines for these interrupts can include trusted operating system code for execution by the operating system kernel 128. The monitoring application 110 can then inform the device driver 102 that the trapped call (e.g., the interrupt) can be passed directly to the operating system kernel 128.

In order for the thread 104 to execute the interrupt, the return address and flag register are saved on the stack 112. The device driver 102 restores the IDTR 105 to the original value supplied by the operating system. For example, the device driver 102 can access the saved value of the IDTR 105 from the memory 114 and place it into the IDTR 105. The replacement of the IDTR 105 with its original value effectively disables the secure sandbox 126. In addition, the device driver 102 modifies the stack 112 by replacing or modifying the return address used by the operating system kernel 128 as the return address for the interrupt. The replaced or modified return address can point to code (epilog 120) mapped into the client application 101 address space by the device driver 102. For example, the epilog 120 requests re-enabling of the secure sandbox 126 by the device driver 102 once the interrupt service routine has been executed.

The thread 104 passes control to the operating system kernel 128. At this point, the thread 104 is no longer executing in the secure sandbox 126. In effect, the operating system can behave as if the device driver 102 has not been loaded or implemented. The thread 104 uses an original operating system provided IDT 118 in order to look up and jump to kernel-mode code to perform the function for the interrupt (e.g., execute the interrupt service routine). Once the execution of the kernel-mode code for the interrupt is complete, execution control for the thread 104 is returned to the code in the epilog 120, which is pointed to by the address stored on the stack 112. The code included in the epilog 120 requests the device driver 102 to enable the secure sandbox 126 (effectively re-enabling the secure sandbox 126) for continued execution of the thread 104. For example, the epilog 120, when executed, calls the device driver 102 in order to re-enable the secure sandbox 126. The client application 101 returns control to the thread 104 at the point where the now serviced interrupt occurred. The thread 104 retrieves its previously stored status and flag registers from the stack 112. Thread execution proceeds with the device driver 102 continuing to monitor the execution of the thread 104.

In some implementations, the client application 101 can create a separate process in which to run the sandboxed thread 104. The sandboxed thread 104 is then prevented from accessing data and code included in the client application 101. The separation of the processes can further protect the host from the effects of executing untrusted code. The client application 101 and the sandboxed thread 104 can communicate using shared memory (e.g., the memory 114), memory-mapped files and custom software interrupts mediated by the monitoring application 110, for example along the lines of the above examples.

While continuing to monitor the execution of the thread 104, the device driver 102 in this example identifies and traps yet another call to the operating system. In this example, the device driver 102 determines, by accessing the permissions table 108, that the trapped call is an interrupt instruction or an operating system instruction that mandates the shutdown of the sandboxed thread 104. For example, an operating system instruction may involve access to data restricted to the thread 104 or data that the thread 104 is not permitted to access. In this example, the device driver 102 can call the operating system kernel 128 to terminate the thread 104. In another example, an interrupt may attempt to perform a read operation from an input device (not shown) that could introduce malicious data into the client application 101. The device driver 102 can request the client application 101 shutdown the thread 104 to prevent the input read operation.

Figure 2A:
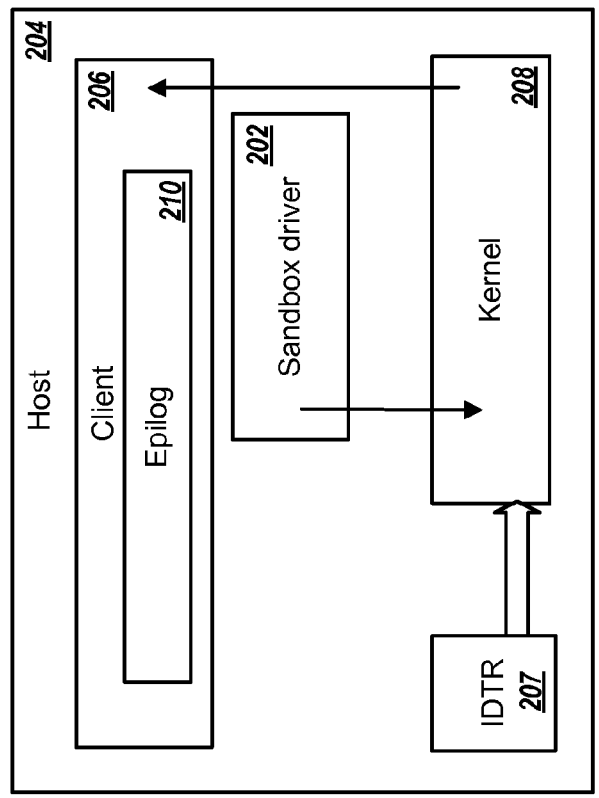
FIGS. 2A-B are block diagrams illustrating an example of a sandbox request in the system of FIG. 1.
Figure 2B:
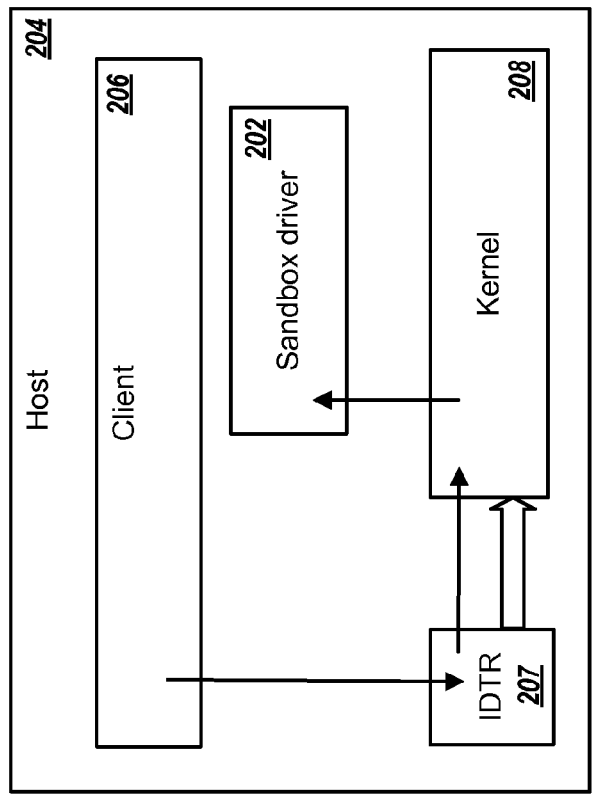

FIGS. 2A-B are block diagrams illustrating an example of a sandbox request in the example system 100 of FIG. 1. For example, referring to FIG. 2A, a host 204 can host a client application 206 that can generate an instance of a thread (e.g., the thread 104) that it would like to run in a secure environment. The client application 206 may call a sandbox driver 202 to enable a secure sandbox (e.g., the secure sandbox 126) for the execution of the thread (e.g., the thread 104). The client application 206 can generate an interrupt or fast call to the operating system kernel 208 for the sandbox driver 202 (e.g., device driver 102). With reference again briefly to FIG. 1, in some implementations the sandbox driver 202 can include the device driver 102, the monitoring application 110, the permissions table 108, and the modified IDT 106. An IDTR 207 (e.g., the IDTR 105) included in the host 204 can point to an IDT (e.g., original IDT 118) to determine the kernel-mode operating system function included in an operating system kernel 208 to execute in order to access the device driver (e.g., device driver 102) included in the sandbox driver 202.

Referring now to FIG. 2B, the sandbox driver 202 can pass control to the operating system kernel 208, and the operating system kernel 208 can return control to the client application 206. When exiting the sandbox driver 202, the operating system kernel 208 returns program execution back to the client application 206. In addition, the sandbox driver 202 maps epilog 210 into the virtual memory map of the client application 206. The epilog 210 includes code that can request the enabling of the secure sandbox (e.g., secure sandbox 126) by the device driver 102 included in the sandbox driver 202.

The IDTR 207 is not modified and remains pointing to the original IDT included in the operating system kernel 208. As such, the secure sandbox (e.g., secure sandbox 126) is not yet enabled. However, if the operating system kernel 208 were to switch tasks (e.g., to service an asynchronous trap) before returning control back to the client application 206, the different "switched to" task would not be executed in a secure sandbox (e.g., secure sandbox 126) as the secure sandbox (e.g., secure sandbox 126) has not yet been established.

Figure 3:
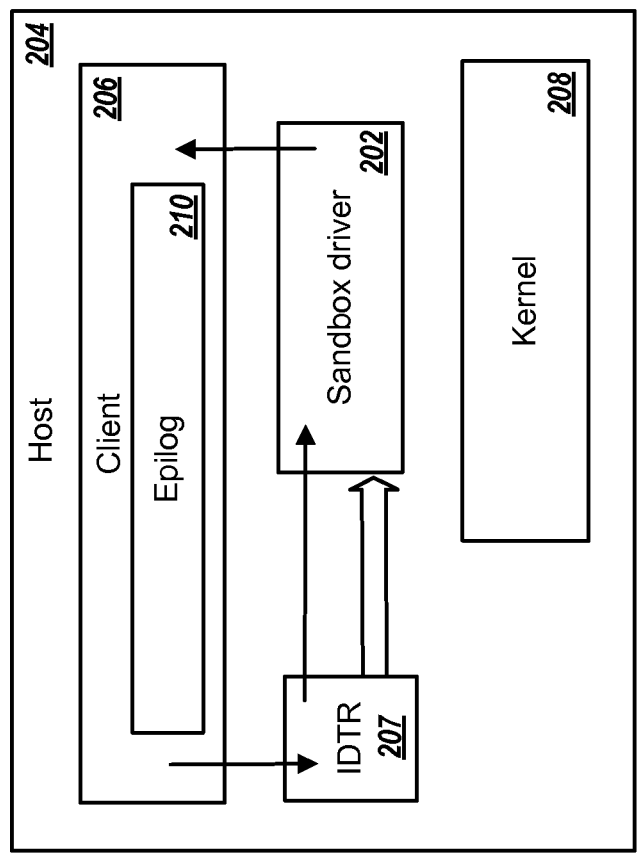
FIG. 3 is a block diagram illustrating an example interception of an operating system instruction by the sandbox of FIGS. 2A-B.

FIG. 3 is a block diagram illustrating an example of the intercepting of an operating system entry instruction (e.g., an interrupt, a syscall or a sysenter) by an IDT-based sandbox. For example, the host 204 can host the client application 206. The client application 206 can call the device driver (e.g., device driver 102) included in the sandbox driver 202 to enable the secure sandbox (e.g., secure sandbox 126) for a thread (e.g., thread 104) of the client application 206 as described with reference to FIGS. 2A-B. A thread (e.g., thread 104) of the client application 206 running in the secure sandbox (e.g., secure sandbox 126) can make an operating system call. The host 204 uses the modified IDTR 207, which points to the modified IDT 106 included in the sandbox driver 202. The sandbox driver 202 can run the associated code to perform the function for the interrupt where the modified IDT 106, the device driver 102 and the replacement code are included in the sandbox driver 202. The operating system call is isolated from the operating system kernel 208. The sandbox driver 202 returns control back to the thread (e.g., thread 104) of the client application 206 running in the secure sandbox (e.g., secure sandbox 126) once the interrupt service is completed. As such, the code included in the epilog 210 need not be executed as the secure sandbox (e.g., secure sandbox 126) remains enabled.

Figure 4A:
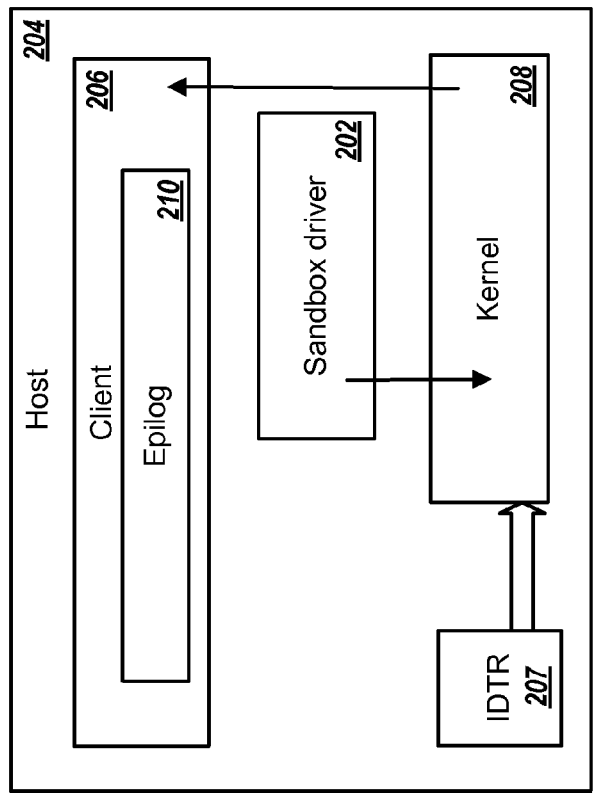
FIGS. 4A-B are block diagrams illustrating an example of the device driver of FIG. 1 passing an interrupt through to an operating system kernel of FIGS. 2A-B and FIG. 3.
Figure 4B:
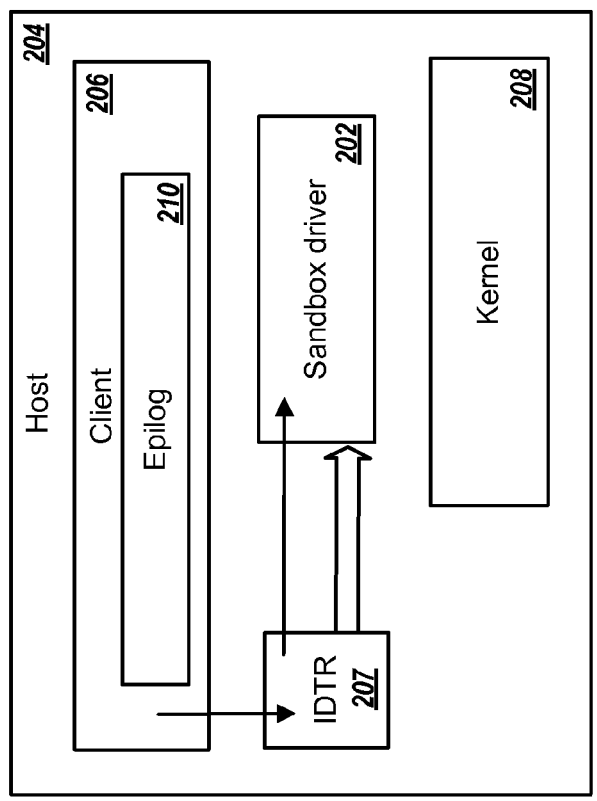

FIGS. 4A-B are block diagrams illustrating an example of the passing of an interrupt by the sandbox driver 202 through to the operating system kernel 208. For example, the host 204 can host the client application 206. The client application 206 call the device driver (e.g., device driver 102) included in the sandbox driver 202 to enable the secure sandbox (e.g., secure sandbox 126) for a thread (e.g., thread 104) of the client application 206 as described with reference to FIGS. 2A-B. Referring now to FIG. 4A, the thread (e.g., thread 104) running in the client application 206 makes a call to an interrupt. For example, the interrupt can be a page fault interrupt (e.g., int 14) that indicates an instruction attempted to access an unpaged memory location. The sandbox driver 202 determines the interrupt (e.g., the page fault interrupt) can be passed on to the operating system kernel 208. Referring now to FIG. 4B, the device driver restores the value of the IDTR 207 to the original operating system value. The IDTR 207 points to the original IDT (e.g., original IDT 118) to determine the code for processing the page fault interrupt. The device driver 102 passes control to the operating system kernel 208 to run the page fault interrupt code. In addition, the device driver modifies the stack (e.g., stack 112) to include, as the return address from the interrupt service, the address of code included in the epilog 210. On completion of the interrupt service, the return address from the stack (e.g., stack 112) points to the code in the epilog 210 for re-enabling the sandbox. The sandbox is re-enabled as previously described with reference to FIGS. 2A-B.

FIGS. 5A-B are block diagrams illustrating an example of re-sandboxing after an IDT-based sandbox intercepts an operating system entry instruction (e.g., an interrupt, a syscall or a sysenter). For example, referring to FIG. 5A, the client application 206 would like to re-enable the secure sandbox (e.g., secure sandbox 126) in order to run a thread (e.g., thread 104) in a secure environment. The client application 206 can access the device driver (e.g., device driver 102) included in the sandbox driver 202 by way of epilog 210 in order to re-enable the secure sandbox (e.g., secure sandbox 126).

Referring now to FIGS. 1, 2 and 5A, the epilog 210 can call the device driver 102 included in the sandbox driver 202 in order to re-enable the IDT-based secure sandbox. Referring to FIG. 5B, the device driver 102 modifies the IDTR 207 to include a base address for a modified IDT 106 resulting in the re-enabling of the IDT-based secure sandbox. When the device driver 102 completes the re-enabling of the secure sandbox, the device driver 102 returns control to the client application 206. As shown in FIG. 4B, the operating system kernel 208 is not involved in the re-enabling of the secure sandbox.

Figure 6:
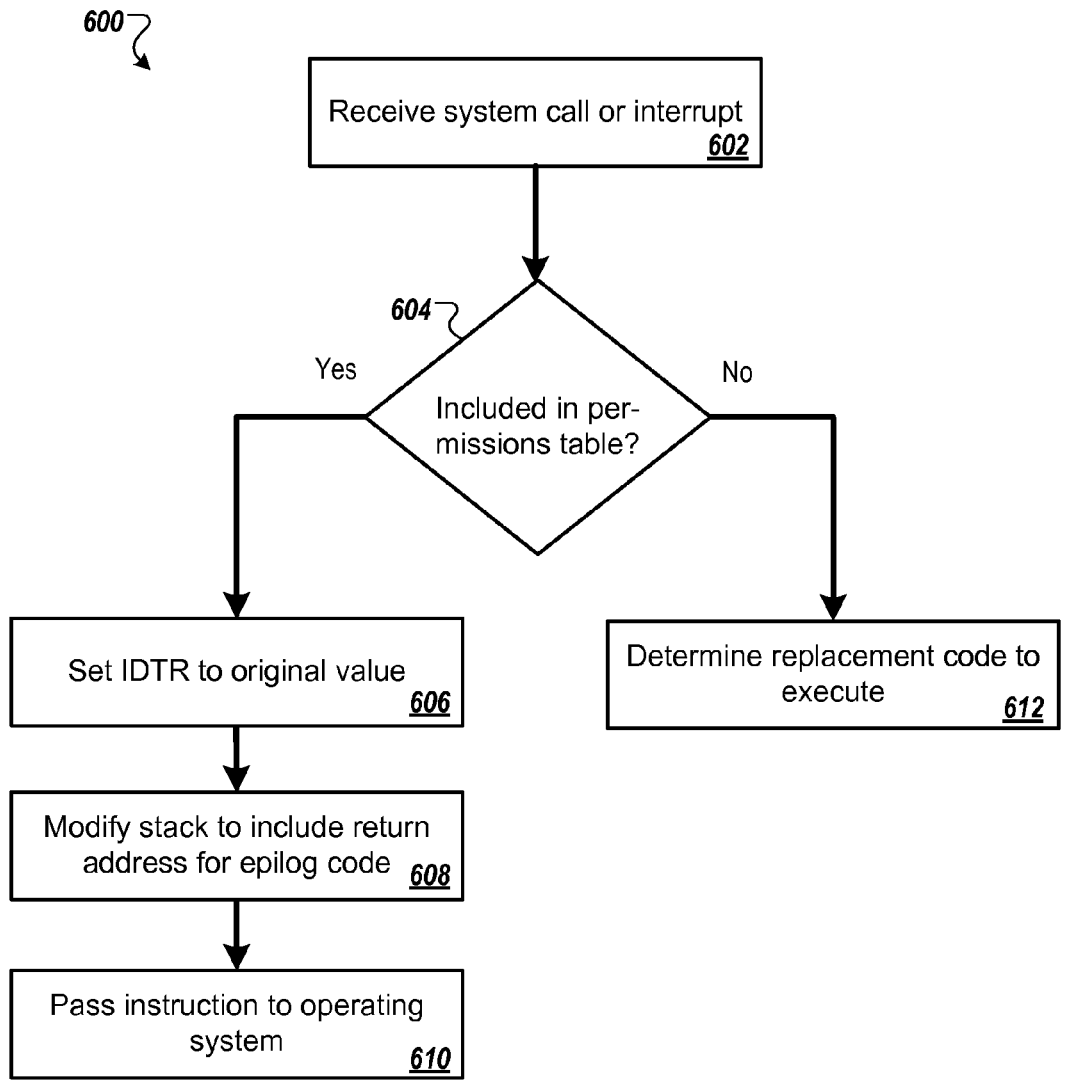
FIG. 6 is a flow chart of an example process for handling an interrupt from a thread of execution within a secure sandbox.

FIG. 6 is a flow chart of an example process 600 for handling an interrupt from a thread of execution within a secure sandbox. The computing system of FIG. 1 can perform the process 600.

The process 600 involves a thread that has already been sandboxed, for example as described above. Accordingly, a request to sandbox the thread may already have been received before the process 600 begins, and the sandbox was created in response to such a request.

A system call or an interrupt is received (step 602). For example, the thread (e.g., thread 104) makes a call to an operating system instruction.

In step 604 a determination is made whether the value of the system call or interrupt is included in a permissions table (e.g., permissions table 108). For example, the permissions table here lists the system calls and interrupts that should be allowed through to the operating system kernel. If the interrupt or system call is included in the permissions table, then the IDTR is set to its original value (step 606) to insure that the interrupt or system call can leave the sandbox. For example, the device driver 102 can restore the value of the IDTR to its original value set by the operating system. The stack is modified to include a return address that points to code in the epilog (step 608). For example, code included in the epilog 120 can be used to re-sandbox the thread (e.g., thread 104) after the interrupt or system call is serviced. The interrupt or system call is passed to the operating system kernel (step 610). The operating system services the interrupt.

On the other hand, if in step 604 the interrupt or system call is not listed in the permissions table, then the replacement code to execute is determined (step 612). For example, the associated replacement code provided by the device driver 102 to perform the function for the interrupt is determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, some terms used herein are associated with the x86 family of processor architectures (e.g., IDT, IDTR, page fault interrupt=0x14 h), and some terms are associated with the Windows operating system (e.g., device driver), but in some implementations other operating systems and/or processor architectures can be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Secure sandboxing can be used on a server, desktop system, a mobile computing device or any other system or device that can be connected to a source of untrusted code such as the internet.

What is claimed is:

1. A method performed in a computer system, the method comprising:
    enabling a secure environment in the computer system for executing a thread comprising a plurality of instructions, wherein:
        an application executing on the computer system generates the thread and initiates execution of the thread in the secure environment; and
        the computer system is configured to redirect the execution of the plurality of instructions from an operating system kernel to the secure environment;
    receiving an instruction from the thread;
    determining whether the instruction includes a call into the operating system kernel, the instruction being one of an interrupt instruction, a system call instruction, or a system enter instruction;
    in response to determining that the instruction is one of the interrupt instruction, the system call instruction, or the system enter instruction, determining that the instruction need not be executed in the secure environment; and
    in response to determining that the instruction need not be executed in the secure environment:
        eliminating the redirection of the execution of the instruction to the secure environment,
        modifying a stack to specify return of control for the thread when the execution of the instruction is completed, and
        passing the control for the thread to the operating system kernel for execution of the instruction.

2. The method of claim 1, further comprising, in response to receiving the instruction from the thread, comparing the instruction to one or more entries in a table, and wherein determining that the instruction need not be executed in the secure environment comprises determining that the instruction need not be executed based on a result of the comparison.

3. The method of claim 1, in response to determining that the instruction is not one of the interrupt instruction, the system call instruction, or the system enter instruction, determining that the instruction should be executed in the secure environment; and in response to determining that the instruction should be executed in the secure environment:

accessing and executing replacement code associated with the instruction, the access to the replacement code indicated by a modified interrupt descriptor table entry pointed to by a modified interrupt descriptor table register.

4. The method of claim 1, further comprising providing code for reconfiguring the computer system for the redirection, the code being specified by the return of control.

5. The method of claim 4, further comprising executing the code specified by the return of control and reconfiguring the computer system for redirection.

6. The method of claim 4, wherein a client application provides the code for reconfiguring the computer system in an epilog.

7. A non-transitory computer storage medium encoded with a computer program, the program comprising instructions that when executed by a computing apparatus causes the computing apparatus to perform operations comprising:

enabling a secure environment in the computer system for executing a thread comprising a plurality of instructions, wherein:

an application executing on the computer system generates the thread and initiates execution of the thread in the secure environment; and the computer system is configured to redirect the execution of the plurality of instructions from an operating system kernel to the secure environment;

receiving an instruction from the thread;

determining whether the instruction includes a call into the operating system kernel, the instruction being one of an interrupt instruction, a system call instruction, or a system enter instruction;

in response to determining that the instruction is one of the interrupt instruction, the system call instruction, or the system enter instruction, determining that the instruction need not be executed in the secure environment; and in response to determining that the instruction need not be executed in the secure environment:

eliminating the redirection of the execution of the instruction to the secure environment, modifying a stack to specify return of control for the thread when the execution of the instruction is completed, and passing the control for the thread to the operating system kernel for execution of the instruction.

8. The non-transitory computer storage medium of claim 7, wherein operations further comprise, in response to receiving the instruction from the thread, comparing the instruction to one or more entries in a table, and wherein determining that the instruction need not be executed in the secure environment comprises determining that the instruction need not be executed based on a result of the comparison.

9. The non-transitory computer storage medium of claim 7, wherein operations further comprise:

in response to determining that the instruction is not one of the interrupt instruction, the system call instruction, or the system enter instruction, determining that the instruction should be executed in the secure environment; and in response to determining that the instruction should be executed in the secure environment:

accessing and executing replacement code associated with the instruction, the access to the replacement code indicated by a modified interrupt descriptor table entry pointed to by a modified interrupt descriptor table register.

10. The non-transitory computer storage medium of claim 7, wherein operations further comprise providing code that includes instructions for reconfiguring the computing apparatus for the redirection, the code being specified by the return of control.

11. The non-transitory computer storage medium of claim 10, wherein operations further comprise executing the instructions included in the code specified by the return of control and reconfiguring the computing apparatus for redirection.

12. The non-transitory computer storage medium of claim 10, wherein a client application provides the instructions for reconfiguring the computer system in an epilog.

13. A system comprising:

a processor; and a computer readable storage device having stored therein:

a client application that, when executing on the system, generates a thread comprising a plurality of instructions, initiates execution of the thread in a secure environment, and sends an instruction from the thread;

an operating system kernel;

a device driver that receives the instruction from the thread, and enables the secure environment, wherein the system is configured to redirect the execution of the instruction from the operating system kernel to the secure environment; and a stack;

wherein the device driver:

determines whether the instruction includes a call into the operating system kernel, the instruction being one of an interrupt instruction, a system call instruction, or a system enter instruction, in response to determining that the instruction is one of the interrupt instruction, the system call instruction, or the system enter instruction, determines that the instruction need not be executed in the secure environment, and in response to determining that the instruction need not be executed in the secure environment:

eliminates the redirection of the execution of the instruction to the secure environment, modifies the stack to specify return of control for the thread when the execution of the instruction is completed, and passes the control for the thread to the operating system kernel for execution of the instruction.

14. The system of claim 13, the computer readable storage device having further stored therein a table, wherein the device driver compares the instruction to one or more entries in the table, and wherein determining that the instruction need not be executed in the secure environment comprises determining that the instruction need not be executed based on a result of the comparison.

15. The system of claim 13, the computer readable storage device having further stored therein a modified interrupt descriptor table and an interrupt descriptor table register, wherein in response to determining that the instruction is not one of the interrupt instruction, the system call instruction, or the system enter instruction, the device driver:
- determines that the instruction should be executed in the secure environment; and
- in response to determining that the instruction should be executed in the secure environment:
  - accesses and executes replacement code associated with the instruction, the access to the replacement code indicated by a modified interrupt descriptor table entry in the modified descriptor table, the entry pointed to by a modified version of the interrupt descriptor table register.

16. The system of claim 13, wherein the device driver provides code that includes instructions for reconfiguring the system for the redirection, the code being specified by the return of control.

17. The system of claim 16, wherein after execution of the instructions included in the code the device driver reconfigures the system for redirection.

18. The system of claim 16, wherein the client application provides the instructions for reconfiguring the system in an epilog.

* * * * *